(12) United States Patent
Bowman

(10) Patent No.: US 6,928,351 B2
(45) Date of Patent: Aug. 9, 2005

(54) STEERING WHEEL MOUNTED WARNING/CROSS-OVER LIGHTS SWITCHES

(75) Inventor: Darrell S. Bowman, Spencerville, IN (US)

(73) Assignee: International Truck Intellectual Property Company, LLC, Warrenville, IL (US)

(*) Notice: Subject to any disclaimer, the term of this patent is extended or adjusted under 35 U.S.C. 154(b) by 0 days.

(21) Appl. No.: 10/701,970

(22) Filed: Nov. 5, 2003

(65) Prior Publication Data

US 2005/0096798 A1 May 5, 2005

(51) Int. Cl.⁷ .................................................. G06F 7/00
(52) U.S. Cl. .............................. 701/36; 701/1; 701/49; 293/102; 293/126; 293/142; 116/28 R; 116/53
(58) Field of Search ................................ 701/36, 1, 49; 293/1, 2, 4, 102, 117, 126, 142; 116/28 R, 53, 52, 51, 35 R

(56) References Cited

U.S. PATENT DOCUMENTS

| | | |
|---|---|---|
| 3,571,537 A | 3/1971 | Cook |
| 5,569,893 A | 10/1996 | Seymour |
| 6,213,526 B1 * | 4/2001 | Swanger et al. ............ 293/117 |

* cited by examiner

*Primary Examiner*—Olga Hernandez
(74) *Attorney, Agent, or Firm*—Jeffrey P. Calfa; Dennis Kelly Sullivan; Susan L. Lukasik

(57) ABSTRACT

Control over school bus warning lights and its cross over arm are implemented through pre-existing steering wheel mounted speed control switches with minimum modification of vehicle hardware.

7 Claims, 8 Drawing Sheets

STEERING WHEEL MOUNTED WARNING/CROSS-OVER LIGHTS SWITCHES

BACKGROUND OF THE INVENTION

1. Technical Field

The invention relates to motor vehicle controls and more particularly to controls relating to specialized or auxiliary equipment for special purpose vehicles, such as passenger embarkation/disembarkation warning systems for school busses.

2. Description of the Problem

Driver controls for motor vehicles are better positioned if consideration is given to the tasks and distractions likely to be confronting the driver while using the controls. A consequence of such considerations is that motor vehicle designers now commonly locate speed control switches on the vehicle's steering wheel. A driver is likely to be maneuvering the vehicle when activating and deactivating the speed control system or when adjusting the settings of the speed control system. It is undesirable that the driver be distracted from driving by removing his hands from the steering wheel while doing so.

Depending upon the intended use of a vehicle, different criteria might govern the placement of controls. Of particular interest to the present invention are how the activities of a bus driver, particularly a school bus driver, might influence the choice of control location. Analysis of school bus drivers' activities behind the wheel has indicated that, as might be expected, that the activation of door controls, warning lights and stop arms demands the most hand movements.

The control electronics for contemporary motor vehicles make increasing use of programmable, digital electronics to receive driver inputs from control switches and to route control signals to devices. The switches on the vehicle steering wheel are no longer typically hard wired to the devices they control, but rather the outputs from the switches are interpreted by a digital computer and the appropriate control signals generated and routed to a controller for the intended device. This eases decisions regarding the location of switches since wires do not have to be routed from switch to controlled device. It also means that the functions of particular switches are not necessarily fixed. The Society of Automotive Engineers (SAE) has published standards relating to motor vehicle digital control networks and communications, including the J1708 and J1939 standards.

SUMMARY OF THE INVENTION

According to the invention there is provided a motor vehicle having a steering wheel and a plurality of control switches mounted on the steering wheel and accessible to a driver handling the steering wheel. The motor vehicle is further equipped with a stop arm extendible from a side of the motor vehicle and warning lights mounted with respect to the exterior of the motor vehicle. A body computer is installed to receive driver input through various switches including the plurality of switches installed on the steering wheel. The body computer is programmed to respond to the signals to control the state of activation of the warning lights and for controlling positioning of the stop arm. The motor vehicle may further include a passenger door which is positioned using compressed air or a motor. The body computer may be further programmed to respond to one of the plurality of switches to generate a control signal for positioning the door in opened and closed positions.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
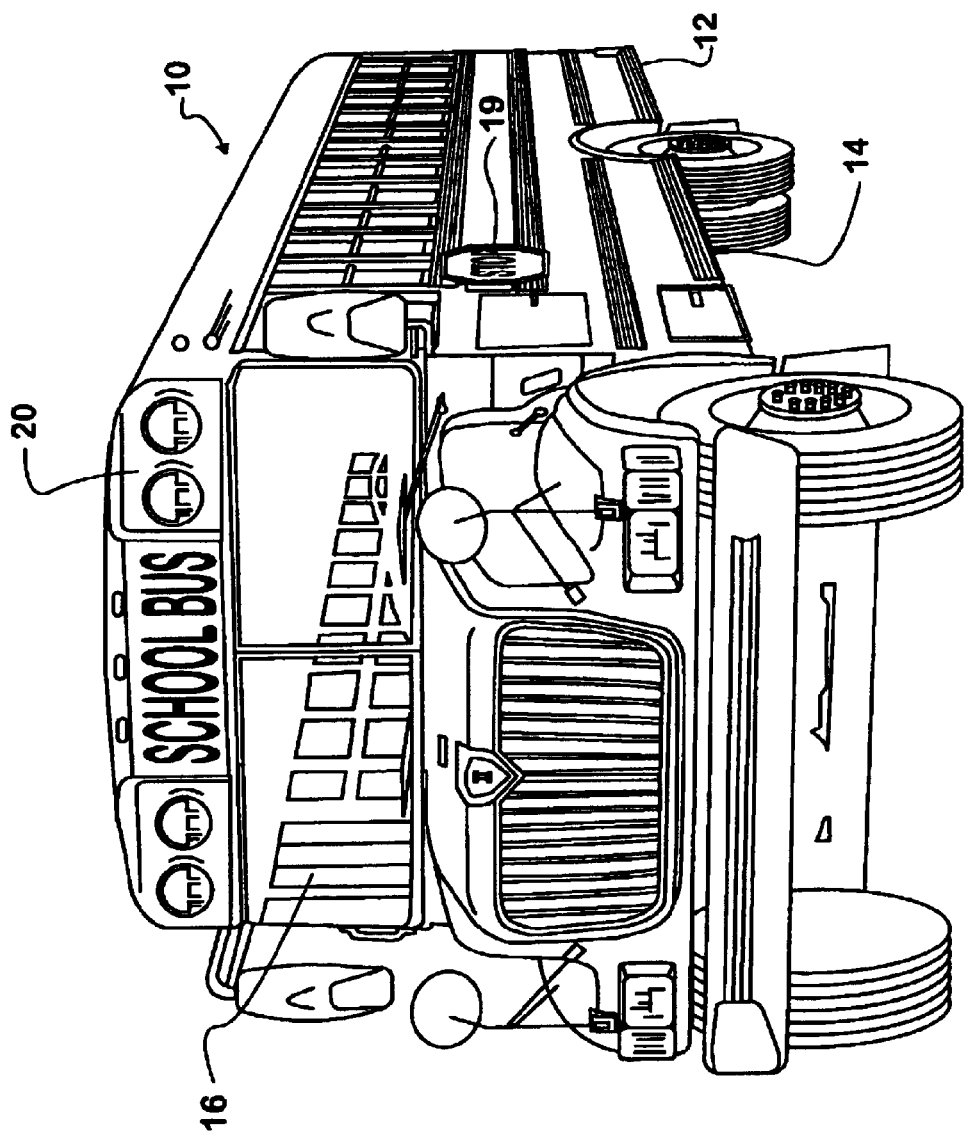
FIG. 1 is a perspective view of a school bus on which the present invention is advantageously practiced.

Referring now to the figures and in particular to FIG. 1, a school bus 10 is illustrated in perspective view. School bus 10 comprises a body 12 on the exterior of which are mounted various warning lights 20, which may flash either amber or red, and a stop arm 18, which swings outwardly from the driver's side 14 of school bus 10 when needed. A passenger door 16 is illustrated as disposed on the opposite side of school bus 10 from stop arm 18, although in some jurisdictions, the door 16 and stop arm 18 may be on the same side of the vehicle.

Figure 2:
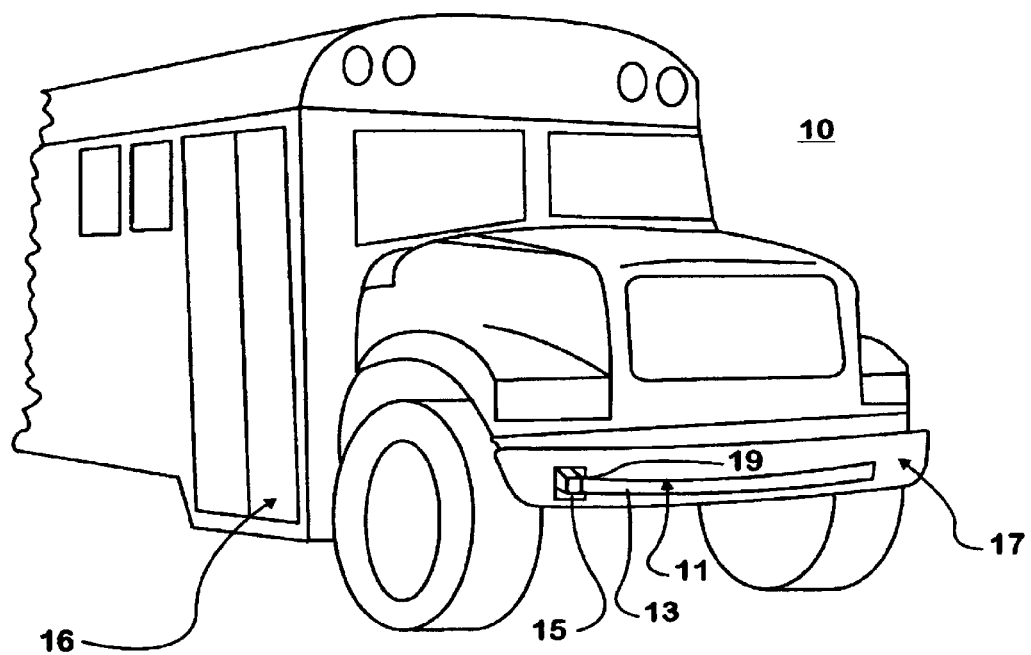
FIG. 2 is a school bus in the bumper integrated safety arm in a retracted position.
Figure 3:
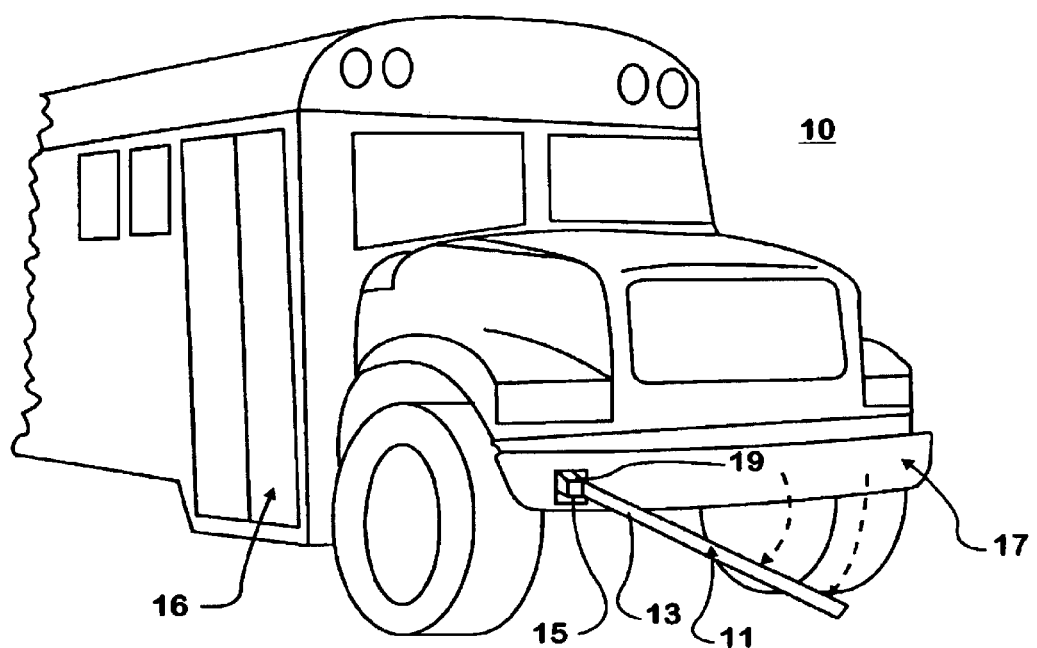
FIG. 3 illustrates the safety arm of FIG. 2 in an extended position.

FIGS. 2 and 3 illustrate a safety crossing arm 11 which may be used with the invention. School bus 10 may carry safety crossing arm 11 installed in a bumper 17. Bumper 17 is formed with a generally rectangular opening 15 through which a pivot mount 19 extends. Safety crossing arm 17 is mounted on pivot mount 19 to swing member 13 outwardly during use. A safety crossing arm suitable for inclusion on Bus 10 is disclosed in U.S. Pat. No. 6,213,526, which is incorporated herein by reference.

Figure 4:
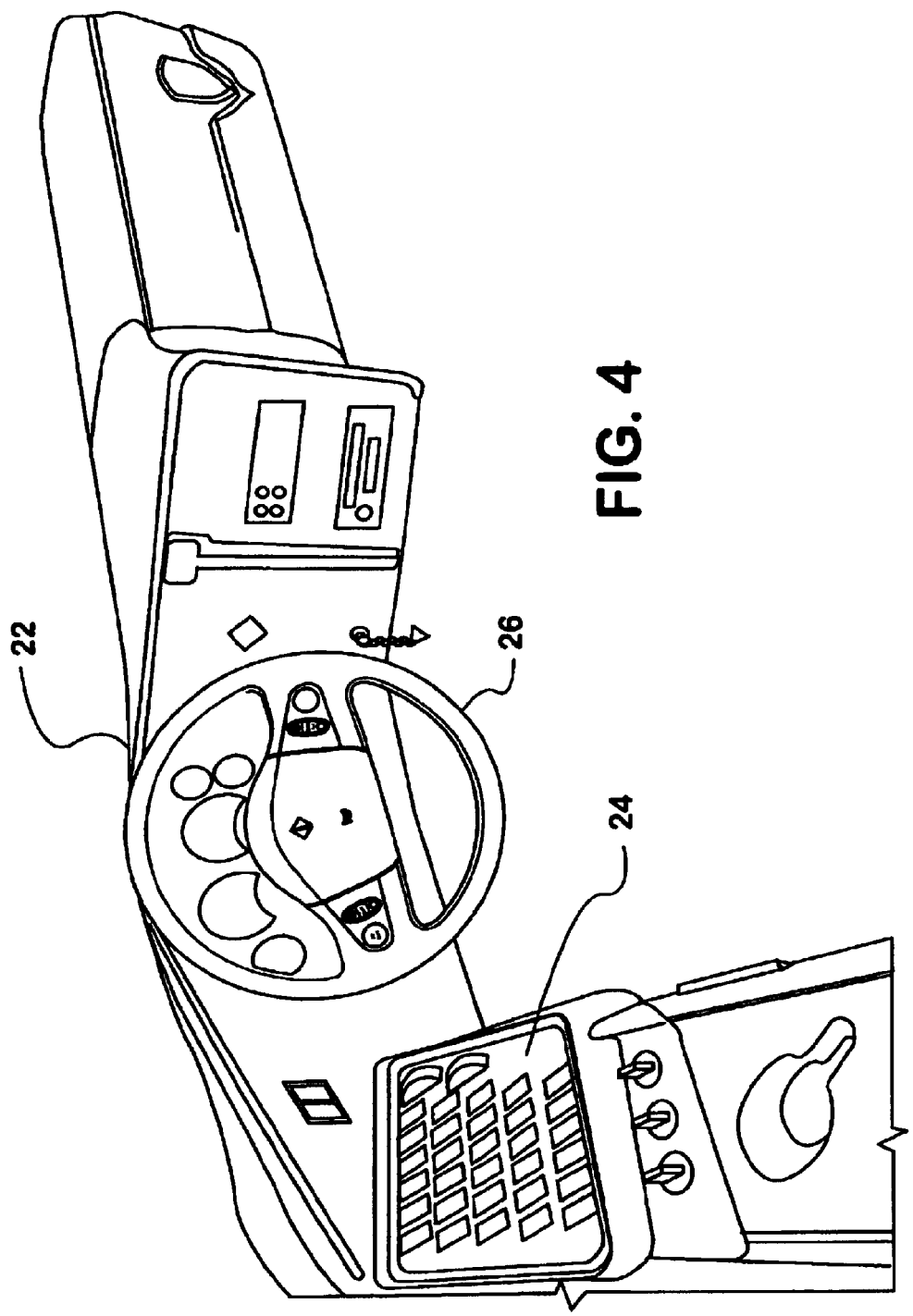
FIG. 4 is a perspective view of driver controls for the bus of FIG. 1.

Referring to FIG. 4, an instrument panel 22 and associated supplemental control panel 24 are illustrated. Instrument panel 22 and supplemental control panel 24 mount a variety of switches used by a driver who sits behind the panels to control various vehicle functions. In addition a steering wheel 26 is positioned spaced from instrument panel 22 for use of a driver for steering school bus 10.

Figure 5:
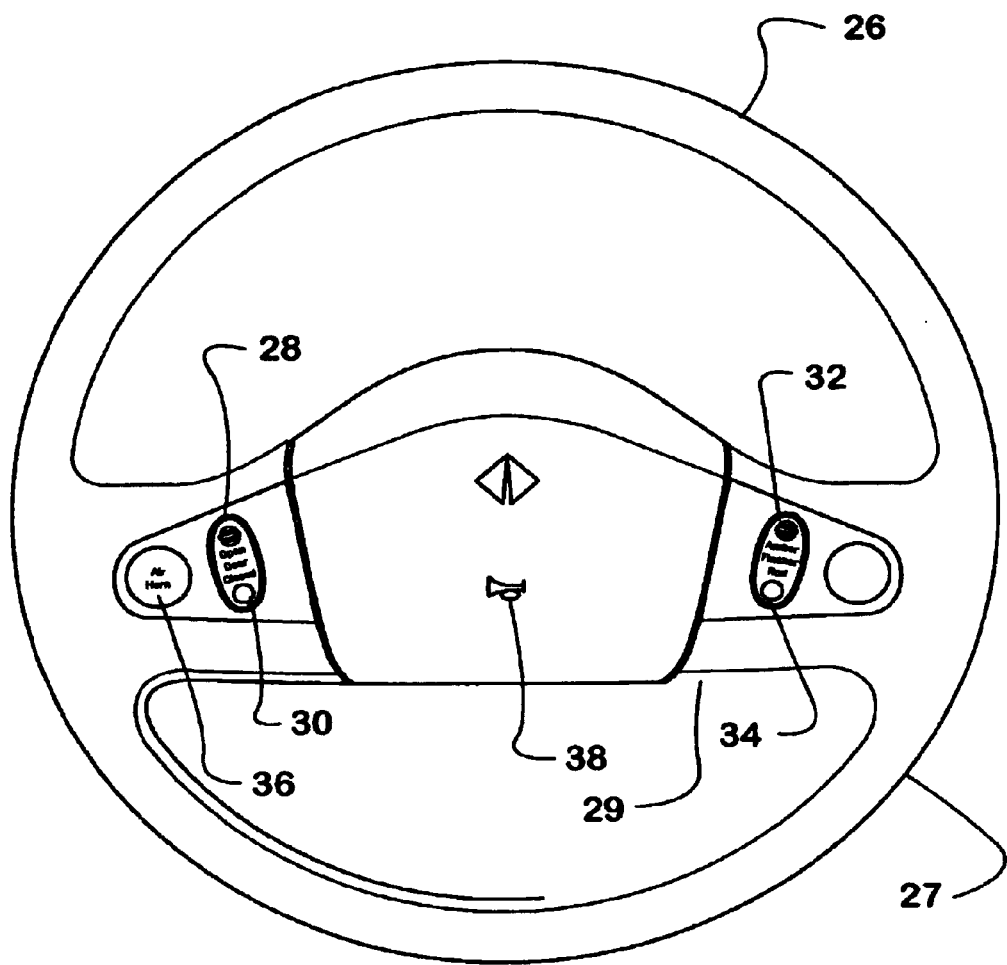
FIG. 5 is a front elevation of a steering wheel for the bus of FIG. 1.

Referring to FIG. 5, steering wheel 26 is illustrated in greater detail. An array of switches are installed on steering wheel cross member 29 which is disposed across an interior chord of perimeter grip 27. Most of the switches are positioned to allow the driver to actuate the switches without moving his hands from the perimeter grip 27. The driver actuates the switches without moving his hands include an air horn button 36, a door open button 28, a door close button 30, an amber warning light flasher actuation button 32 and a red warning light flasher actuation button 34. In addition, a city horn button 38 is placed in the center of cross member 38. Door open button 28, door close button 30, amber warning light flasher button 32 and red warning light flasher button 34 utilize switches originally provided for a speed control system. The switches are readily relabeled for use in controlling the various warning functions. The speed control functions, if retained on the vehicle, maybe moved in turn to the supplemental control panel 24. Crossing arm and stop arm control are implemented as actions responsive, in part, to the warning light control buttons.

Figure 6:
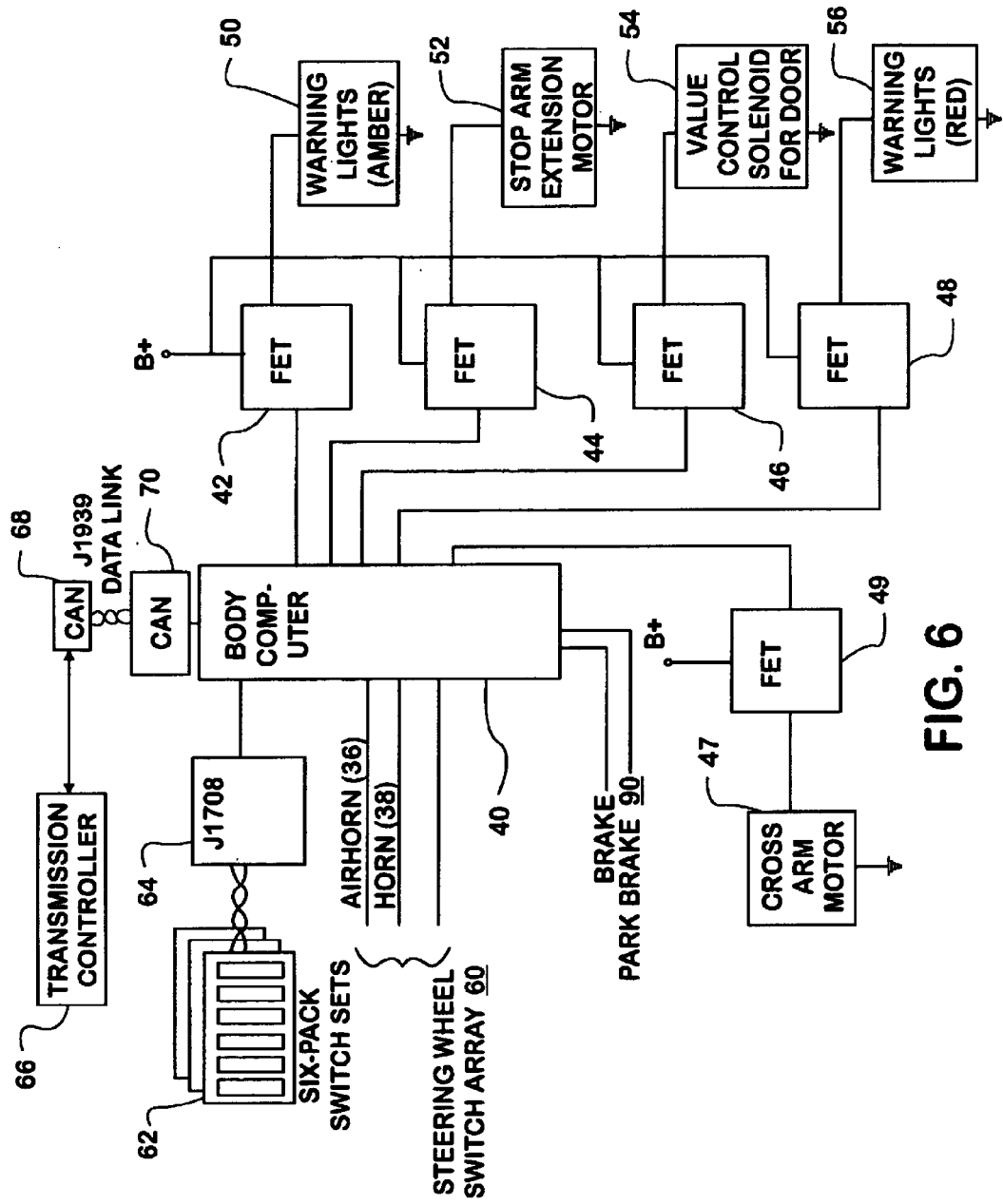
FIG. 6 is a circuit schematic block diagram illustrating control arrangements for steering wheel mounted switches.

Referring to FIG. 6 a circuit schematic illustrates implementation of control over school bus warning features using switches originally incorporated on the vehicle for a speed control system. A body computer 40 is a programmable computer with broad responsibilities for vehicle operations. Body computer 40 communicates with various vehicle electrical components, either by a direct connection or over a data bus. At least two types of databus are present including an SAE J1708 databus 64 and an SAE J1939 databus implemented using controller area network (CAN) controllers 68, 70. The J1939 bus (also called a data link) carries high data rate data between body computer 40 and other controllers such as an engine controller (not shown) and an automatic transmission controller 66. Among the data received over the J1939 databus is indication of the transmission position, e.g. whether the transmission is in park. The J1708 bus 64 handles low data rate communications between body computer 40 and switch packs 62. The array 60 of steering wheel switches provides inputs directly to a vehicle body computer 40. Body computer 60 is also connected to receive directly input state signals relating to the position of a parking brake. Body computer 60 also provides signals controlling a plurality of FET switches 42, 44, 46, 48 and 49. The FET switches may be cycled on and off, such as FET switches 42, 48 for causing amber warning lights 50 and red warning lights 56, respectively, to flash on and off. FET switches 44, 46 are activated to operate a stop arm extension and retraction motor 52 and a valve solenoid 54 controlling the opening and closing of passenger door 16, respectively. Fet 49 controls activation of a cross arm extension motor 47. Some speed control functionality formerly implemented through steering wheel switch array 60 may be moved to one of the six pack switch sets 62 if retained.

The operation of the warning lights 50, 56, passenger door 16, arm extension motor 52 and crossing arm extension motor 47 depend not only a operator manipulation of switches in switch array 60 but may also depend upon the status of the vehicle transmission and vehicle parking brake. For example, some State laws may require setting the park brake before allowing children to board or disembark from the bus 10. If so, body computer 40 may be programmed to permit the passenger door to open and close, when the warning lights have been activated, only if the park brake 90 is set. Similarly, data from the transmission controller 66 may be interrogated to determine if the transmission is in park or if the engine speed is zero.

Figure 7:
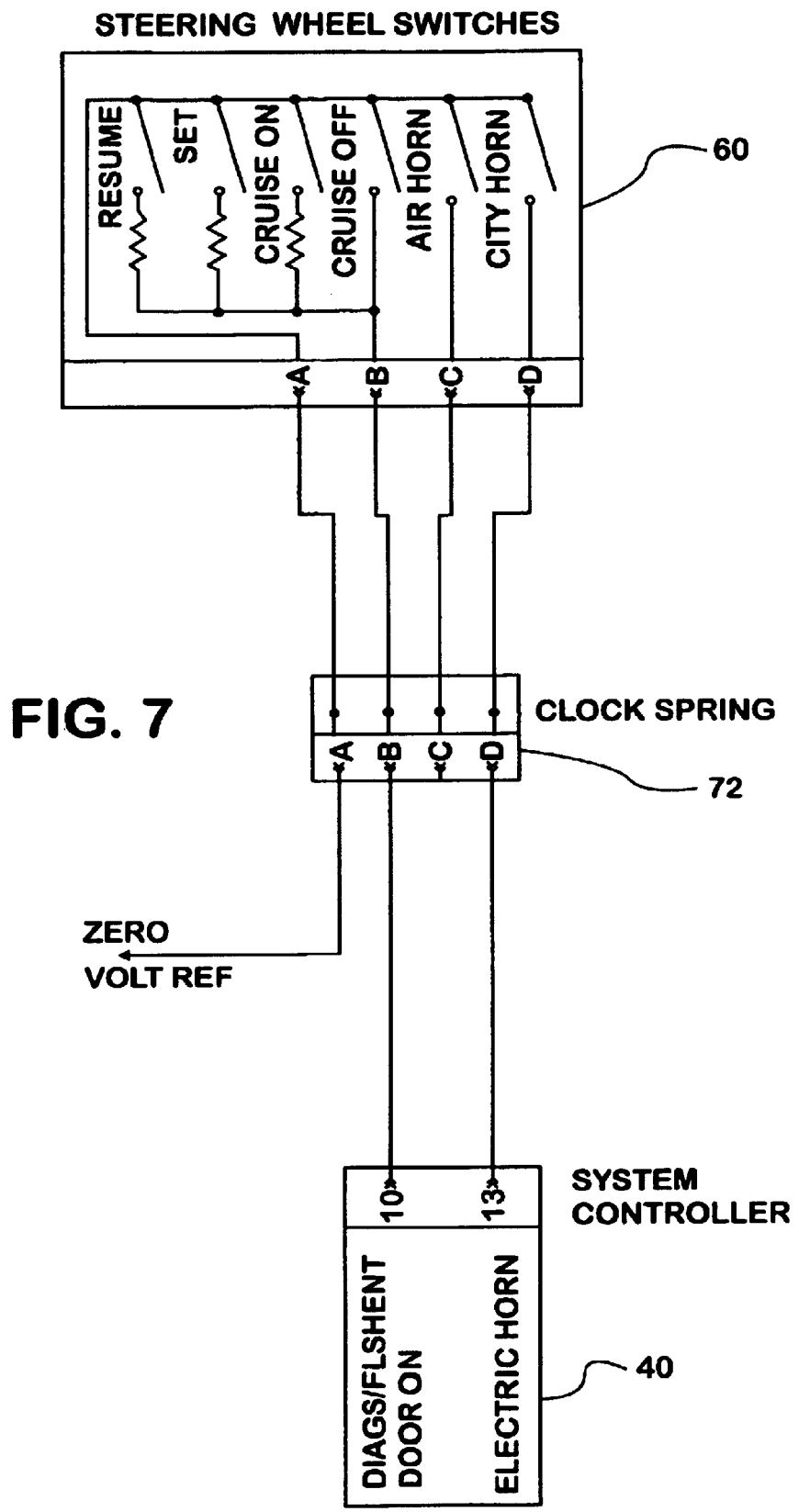
FIG. 7 is a circuit diagram of the steering wheel switches of FIG. 6.

Referring to FIG. 7 a conventional switch array 60 such as normally used to implement steering wheel mounted controls for a speed control system for a medium duty truck and adapted to implement the present invention is shown. Switch array 60 conventionally includes switches for a city horn, an air horn, an off switch, an on switch, a speed set switch and a resume switch. All of the switches are momentary contact switches, opening after being depressed by an operator. The on, set and resume switches are each connected in series with a resistor. The off, on, set and resume switches are tied to a common node which is connected through a steering column interface 72 to the body controller/system controller 40. The resistors differ in value allowing determination, on account of differing current, of which of the four switches are in use. Assignment of a particular function to a switch is arbitrary. The functionality of the air horn and city horn switches is not changed.

Figure 8:
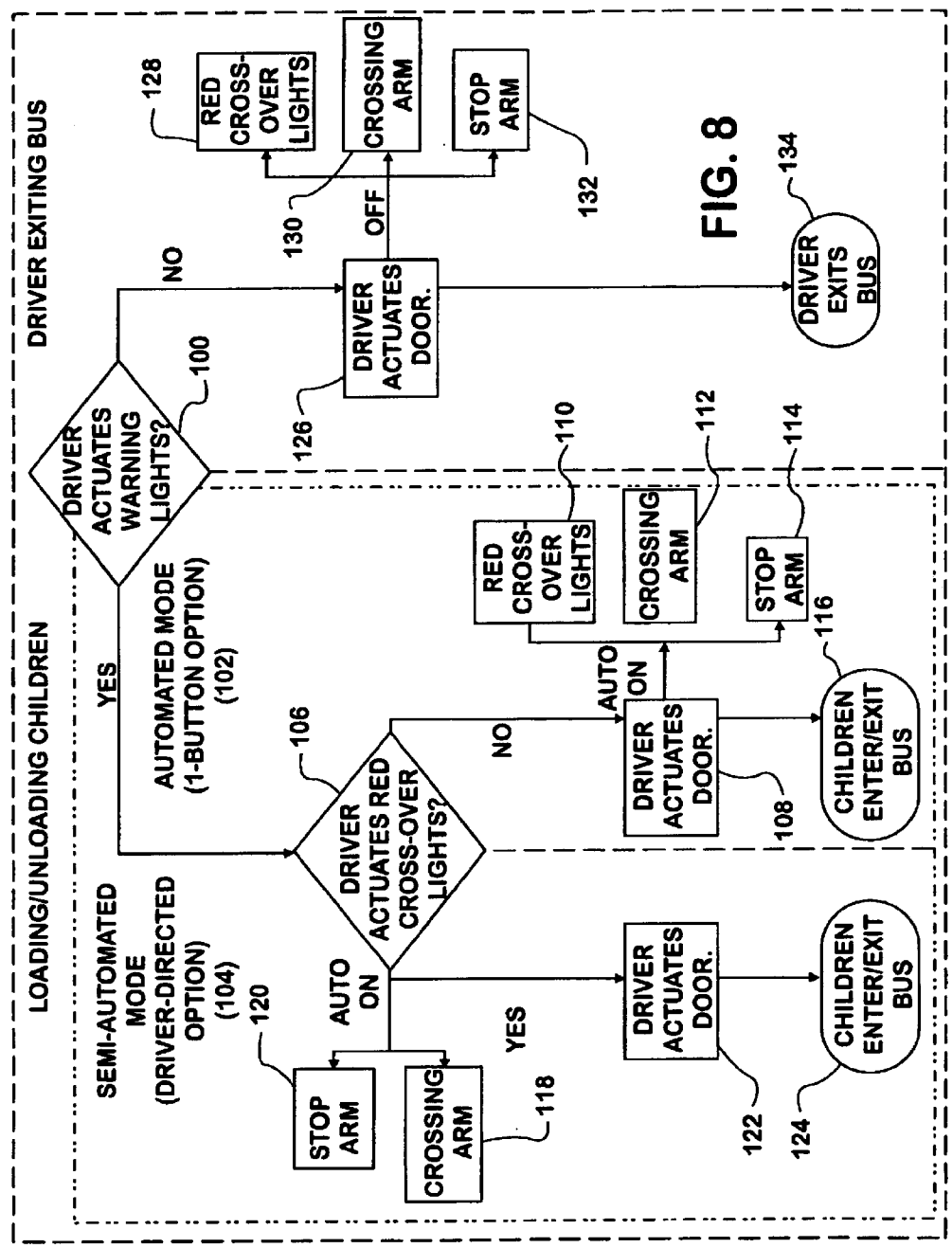
FIG. 8 is a flow chart illustrating cross over lights and crossing arm operation.

Referring now to FIG. 8, a flow chart is used to illustrate operation of a preferred embodiment of the invention. Operation of the warning system depends initially on the driver activating the amber warning lights as indicated at step 100. If the lights are not activated, driver depression of the door open button 28 (step 126) is not accompanied by activation of any other warning device. Accordingly the red cross-over warning lights, crossing arm and stop arm (steps 128, 130 and 132) are all off, allowing the driver to exit the bus (step 134).

The embarkation/disembarkation of children from school bus 10 can be done with the warning system in an automated mode 102 or a semi-automated mode 104. Operation of the warning system is entered whenever the amber warning lights are activated (step 100). In the semi-automated mode the stop arm 18 and crossing arm 11 are activated (steps 118, 120) in response to the driver activating the red cross-over lights (step 106). The driver then opens the door (step 122) and children can enter or exit the bus (step 124). In automated mode the driver activates the red warning lights (step 106) and then, upon his actuating the door (step 108) the red warning lights turn on (step 110), and the crossing arm and stop arm extend (steps 112, 114). Children may then enter or exit the bus.

The present invention provides a low cost adaptation of speed control switches for another function in an environment where speed control functions are of less importance or not provided at all. Further, driver handling of warning light/arm features of a school bus are moved to the steering wheel of the school bus eliminating the need for the driver to move his/her hands from the wheel.

While the invention is shown in only one of its forms, it is not thus limited but is susceptible to various changes and modifications without departing from the spirit and scope of the invention.

What is claimed is:

1. A motor vehicle comprising:
    a steering wheel;
    a plurality of control switches mounted on the steering wheel and accessible to a driver handling the steering wheel;
    a stop arm extendible from a side of the motor vehicle;
    warning lights mounted with respect to the exterior of the motor vehicle; and
    a body computer coupled to receive input signals from the plurality of control switches and programmed to generate in response thereto signals controlling the state of activation of the warning lights and for controlling positioning of the stop arm.

2. A motor vehicle as set forth in claim 1, further comprising:
    a passenger door;
    a crossing arm extendible from the front of the vehicle;
    means responsive to a control signal for positioning the door in opened and closed positions; and
    the body computer being further programmed to respond to a signal received from one of the plurality of switches for generating a door position control signal and for applying the door position control signal to means for positioning.

3. A motor vehicle as set forth in claim 2, the warning lights further comprising red and amber flashing lights.

4. A motor vehicle as set forth in claim 3, further comprising:
- first and second modes of operation of the warning lights, a first mode providing for operation of the stop arm following activation of the red warning lights and a second mode providing activation of the red warning lights following activation opening of the passenger door.

5. Operator's controls for a school bus having external actuable indicators for boarding operations, the operator's controls comprising:
- a steering wheel;
- a plurality of switches installed in the steering wheel and actuable by an operator gripping the steering wheel, the plurality of switches including at least a first switch for activating the external actuable indicators;
- the school bus further including a passenger door and amber and red warning lights as part of the external actuable indicators;
- the plurality of switches including a switch for controlling activation of the amber warning lights, a switch for controlling activation of the red warning lights and a switch for controlling the opening and closing of the passenger door;
- the school bus further including an externally mounted, extendable stop arm, the body computer being responsive to status of the warning light activation control switches for controlling extension of the stop arm and crossing arm.

6. Operator's controls for a school bus as set forth in claim 5, further comprising:
- a body computer;
- the plurality of switches being connected to the body computer; and
- the functionality of the plurality of control buttons being programmed into the body computer.

7. Operator's controls for a school bus as set forth in claim 6, further comprising:
- inputs to the body computer indicating vehicle parking brake and transmission status.

* * * * *